US006235816B1

(12) United States Patent
Lorcks et al.

(10) Patent No.: US 6,235,816 B1
(45) Date of Patent: May 22, 2001

(54) COMPOSITIONS AND METHODS FOR MANUFACTURING THERMOPLASTIC STARCH BLENDS

(75) Inventors: Jurgen Lorcks, Rees; Winfried Pommeranz, Enger; Harald Schmidt, Emmerich, all of (DE)

(73) Assignee: Biotec Biologische Naturverpackungen GmbH (DE)

( * ) Notice: Subject to any disclaimer, the term of this patent is extended or adjusted under 35 U.S.C. 154(b) by 0 days.

(21) Appl. No.: 09/428,512

(22) Filed: Oct. 27, 1999

Related U.S. Application Data

(63) Continuation of application No. 08/930,748, filed as application No. PCT/IB96/00275 on Apr. 2, 1996, now Pat. No. 6,096,809.

(30) Foreign Application Priority Data

Apr. 7, 1995 (DE) ............................................. 195 13 237
Apr. 24, 1995 (DE) ............................................. 195 15 013

(51) Int. Cl.[7] ....................................................... C08L 3/02
(52) U.S. Cl. ........................... 524/47; 523/128; 524/386; 524/387; 524/599; 524/601; 524/845; 524/539; 525/54.24
(58) Field of Search ............................. 524/47, 386, 387, 524/599, 601, 845, 539; 525/54.24; 523/128

(56) References Cited

U.S. PATENT DOCUMENTS

| | | | |
|---|---|---|---|
| 3,446,079 | 5/1969 | Hohenstein | 73/517 |
| 3,850,863 | 11/1974 | Clendinning et al. | 260/7.5 |
| 3,867,324 | 2/1975 | Clendinning et al. | 260/23 H |
| 3,921,333 | 11/1975 | Clendinning et al. | 47/37 |
| 3,949,145 | 4/1976 | Otey et al. | 428/423 |
| 4,076,846 | 2/1978 | Nakasuka et al. | 426/62 |
| 4,133,784 | 1/1979 | Otey et al. | 260/17.4 ST |
| 4,306,059 | 12/1981 | Yokobayashi et al. | 536/1 |
| 4,394,930 | 7/1983 | Korpman | 220/444 |
| 4,410,571 | 10/1983 | Korpman | 427/385.5 |
| 4,454,268 | 6/1984 | Otey et al. | 524/47 |
| 4,482,386 | 11/1984 | Wittwer et al. | 106/135 |
| 4,655,840 | 4/1987 | Wittwer et al. | 106/126 |
| 4,673,438 | 6/1987 | Wittwer et al. | 106/126 |
| 4,846,932 | 7/1989 | Karita et al. | 162/127 |
| 4,863,655 | 9/1989 | Lacourse et al. | 264/53 |
| 5,035,930 | 7/1991 | Lacourse et al. | 428/35.6 |
| 5,043,196 | 8/1991 | Lacourse et al. | 428/35.6 |
| 5,059,642 | 10/1991 | Jane et al. | 524/52 |
| 5,095,054 * | 3/1992 | Lay et al. | 524/47 |
| 5,108,807 | 4/1992 | Tucker | 428/35.2 |
| 5,110,838 | 5/1992 | Tokiwa et al. | 524/81 |
| 5,115,000 | 5/1992 | Jane et al. | 524/47 |
| 5,185,382 | 2/1993 | Neumann et al. | 521/84.1 |
| 5,186,990 | 2/1993 | Starcevich | 428/35.6 |
| 5,206,087 | 4/1993 | Tokiwa et al. | 428/403 |
| 5,208,267 | 5/1993 | Neumann et al. | 521/79 |
| 5,234,977 | 8/1993 | Bastioli et al. | 524/47 |
| 5,248,702 | 9/1993 | Neumann et al. | 521/84.1 |
| 5,252,271 | 10/1993 | Jeffs | 264/54 |
| 5,256,711 | 10/1993 | Tokiwa et al. | 524/47 |
| 5,258,430 | 11/1993 | Bastioli et al. | 524/52 |
| 5,262,458 | 11/1993 | Bastioli et al. | 524/52 |
| 5,266,368 | 11/1993 | Miller | 428/35.6 |
| 5,272,181 | 12/1993 | Boehmer et al. | 521/84.1 |
| 5,275,774 | 1/1994 | Bahr et al. | 264/211 |
| 5,280,055 | 1/1994 | Tomka | 524/47 |
| 5,286,770 | 2/1994 | Bastioli et al. | 524/52 |
| 5,288,318 | 2/1994 | Mayer et al. | 106/213 |
| 5,288,765 | 2/1994 | Bastioli et al. | 524/84.1 |

(List continued on next page.)

FOREIGN PATENT DOCUMENTS

| | | |
|---|---|---|
| 4 237 535 | 5/1994 | (DE) . |
| 0 409 781 A2 | 1/1961 | (EP) . |
| 0 032 802 A1 | 7/1981 | (EP) . |
| 0 045 621 * | 2/1982 | (EP) ....................... 524/47 |
| 0 327 505 A2 | 8/1989 | (EP) . |
| 0 400 532 A1 | 12/1990 | (EP) . |
| 0 407 350 A2 | 1/1991 | (EP) . |
| 0 408 502 A2 | 1/1991 | (EP) . |
| 0 408 503 A2 | 1/1991 | (EP) . |
| 0 409 782 A3 | 1/1991 | (EP) . |
| 0 524 920 A1 | 1/1993 | (EP) . |
| WO 93/00399 | 1/1993 | (EP) . |
| 0 525 245 A1 | 2/1993 | (EP) . |
| 0 539 541 B1 | 5/1993 | (EP) . |
| 0 535 994 | 7/1993 | (EP) . |
| 0 596 437 * | 5/1994 | (EP) . |
| 0 596 467 | 5/1994 | (EP) . |
| 0 641 817 | 8/1995 | (EP) . |
| 9 005 161 | 3/1988 | (WO) . |
| 9 209 654 * | 6/1992 | (WO) . |
| 9 307 213 * | 4/1993 | (WO) . |

OTHER PUBLICATIONS

Austenal Labs V. Nobilium Processing (DC NILL) 115 USPQ 44, 1957.*

Petrolite Corp V. Watson (DC DC) 113 USPQ 248, 1957.*

Mater Bi, *Stärkewerkstffe Sind Reif Für Breite Anwendungen*.

International Preliminary Exam Report (IPER), PC/IB96/00275, published Aug. 26, 1996.*

*Primary Examiner*—Peter A. Szekely
(74) *Attorney, Agent, or Firm*—Workman, Nydegger & Seeley

(57) ABSTRACT

A biologically degradable polymer mixture containing at least one biopolymer made from renewable raw materials and a polymer selected from the following materials: an aromatic polyester; a polyester-copolymer with both aliphatic and aromatic blocks; a polyesteramide; a polyglycol; a polyester urethane; and/or mixtures of these components. The preferred renewable raw material is starch, more preferably native starch, most preferably native starch that has been predried.

33 Claims, No Drawings

U.S. PATENT DOCUMENTS

| | | | |
|---|---|---|---|
| 5,292,782 | 3/1994 | Bastioli et al. | 524/47 |
| 5,308,879 | 5/1994 | Akamatu et al. | 521/84.1 |
| 5,314,754 | 5/1994 | Knight | 428/532 |
| 5,314,934 | 5/1994 | Tomka | 524/53 |
| 5,317,037 | 5/1994 | Golden et al. | 523/128 |
| 5,360,830 | 11/1994 | Bastioli et al. | 521/84.1 |
| 5,362,777 * | 11/1994 | Tomka | 524/47 |
| 5,372,877 | 12/1994 | Kannankeril | 428/283 |
| 5,382,611 | 1/1995 | Stepto et al. | 524/47 |
| 5,389,322 | 2/1995 | Kim et al. | 264/112 |
| 5,393,804 | 2/1995 | George et al. | 523/128 |
| 5,397,834 | 3/1995 | Jane et al. | 525/54.1 |
| 5,405,564 | 4/1995 | Stepto et al. | 264/115 |
| 5,412,005 | 5/1995 | Bastioli et al. | 524/47 |
| 5,415,827 | 5/1995 | Tomka et al. | 264/510 |
| 5,427,614 | 6/1995 | Wittwer et al. | 106/213 |
| 5,436,078 | 7/1995 | Bühler et al. | 428/474.4 |
| 5,462,980 | 10/1995 | Bastioli et al. | 524/47 |
| 5,476,621 | 12/1995 | Kustner | 264/53 |
| 5,480,923 | 1/1996 | Schmid et al. | 524/47 |
| 5,500,465 | 3/1996 | Krishnan et al. | 524/47 |
| 5,512,090 | 4/1996 | Franke et al. | 106/154.1 |
| 5,525,281 | 6/1996 | Lörcks et al. | 264/101 |
| 5,844,023 * | 12/1998 | Tomka . | |
| 6,062,228 * | 5/2000 | Loercks et al. | 131/332 |

* cited by examiner

COMPOSITIONS AND METHODS FOR MANUFACTURING THERMOPLASTIC STARCH BLENDS

RELATED APPLICATIONS

This application is a continuation of copending U.S. application Ser. No. 08/930,748, filed Dec. 15, 1997, which is an application filed under 35 U.S.C. § 371 of International Patent Application No. PCT/IB96/00275, filed Apr. 2, 1996, and which claims the benefit under 35 U.S.C. § 119 of earlier filed German Patent Application No. 195 13 237.8, filed Apr. 7, 1995, and German Application No. 195 15 013.9, filed Apr. 24, 1995. For purposes of disclosure, the foregoing U.S. application Ser. No. 08/930,748, now U.S. Pat. No. 6,096,809 is incorporated herein by specific reference.

BACKGROUND OF THE INVENTION

1. The Field of the Invention

The present invention relates to a biologically degradable polymer mixture, to a process for its preparation and to a method of processing the polymer mixture according to the invention. More particularly, the invention relates to the manufacture of biodegradable polymer blends that include thermoplastic starch and polymers that are at least partially biodegradable.

2. The Relevant Technology

Proposals for the preparation of biologically degradable polymer mixtures are known from a large number of patent documents and articles. The great problem in the case of polymer mixtures lies, as a rule, in that those mixtures which have an excellent, biological degradability have only limited possibilities for use in the area of engineering plastics, thereby explaining the relatively modest success to date. Polymer mixtures having improved properties are either biologically inadequate or degradable with increased effort or else are too expensive.

From EP 535 994 a polymer mixture is known consisting essentially of starch and an aliphatic polyester, for example polycaprolactone, where the starch is preferably destructurized with water.

Moreover, in an article in the journal "Starke", Volume 45, No. 9, Sep. 1, 1993, Weinheim, pages 314 to 322, the use of starch in the modification of synthetic plastics is described. Here it is proposed first of all to gelatinize the starch by means of water, in connection with which it is mentioned that this gelatinization takes place by means of an endothermic process. In view of this, one may assume that the "gelatinized starch" mentioned therein is most likely destructurized starch, which is mixed with a range of synthetic plastics in order to develop new composite materials.

In contrast, and in knowledge of the inadequacies of starch destructurized solely with water, it is proposed in DE 42 37 535 for a biologically degradable polymer mixture to incorporate therein thermoplastic starch that is prepared using a suitable plasticizing agent in addition to processing to remove water, either before or during the process of mixing starch with the plasticizing agent. The proposed polymer mixtures contain thermoplastic starch, a hydrophobic polymer and a phase mediator, with a mixture of thermoplastic starch and polycaprolactone being proposed as the preferred mixture.

Aliphatic polyesters are, per se, suitable mixing components for the preparation of biologically degradable polymer mixtures, since they have a good biological degradability. However, aliphatic polyesters have only moderately appropriate material properties, for example, with regard to melting point, tensile strength, and the like, which is why even corresponding mixtures using a polymer prepared on the basis of renewable raw materials, for example thermoplastic starch, have only moderately appropriate properties, thereby again placing in question the possibility of using such blends in the field of engineering plastics.

SUMMARY AND OBJECTS OF THE INVENTION

It is therefore an object of the present invention to propose a biologically degradable polymer mixture which both is flawlessly degradable biologically and in addition has good mechanical and thermal properties, so that use as an engineering plastic or as a polymer material is appropriate. A further prerequisite for suitability as a polymer material also lies in the price for the polymer mixture proposed having an acceptable magnitude.

The present invention is directed to compositions that include blends of thermoplastic starch and one or more additional polymers. The thermoplastic starch portion imparts good biodegradability and low cost while the additional polymers impart improved chemical and/or physical properties to the blends.

The term "thermoplastic starch" describes starch-based compositions made by mixing starch and with an appropriate plasticizing agent such as glycerol or sorbitol under conditions that yield a thermoplastic starch melt. The water is reduced to below about 5% by weight of the thermoplastic starch composition either before or during the mixing process. For example, the starch can be predried before mixing with the plasticizing agent. Alternatively, native starch that includes its natural water content can be mixed with the plasticizing agent in a heated mixing apparatus that allows for venting of the excess moisture in the form of water vapor.

Suitable plasticizing agents include glycerol, sorbitol, sugar alcohols, hydroxy acids, salts of hydroxy acids, hydroxy acid oligomers, salts of hydroxy acid oligomers, low molecular weight polyesteramides, polyvinyl alcohol, and the like.

The one or more additional polymers mixed with the thermoplastic starch to form the inventive blends include aromatic polyesters, polyester copolymers having both aliphatic and aromatic blocks (i.e. the so-called "aliphatic-aromatic copolyesters"), polyester amides, polyethylene oxide polymers, polyglycols, and polyester urethanes.

Additional components may be added to the thermoplastic starch blends according to the invention, including additional plasticizers, stabilizers, antiflaming agents, additional biologically degradable biopolymers, plant fibers, organic fillers, cellulose esters, polyvinyl alcohol, polyvinyl acetate, polyacrylates, hydrophobic proteins, gelatin, zein, polysaccharides, polylactides, fatty acid derivatives, lecithin, chitosan, shellac, and cross-linking agents is further added to the thermoplastic starch/polymer blend. Suitable aliphatic polyesters may be added, including polylactic acid, polyhydroxybutyric acid, polyhydroxybutyric acid-hydroxyvaleric acid copolymer, and polycaprolactone.

In a preferred process the thermoplastic starch melt is blended with the one or more additional polymers under conditions that yield a melt having a water content of less than 1% by weight of the composition. By removing the water either before or during processing, it is possible in some cases to form a condensation reaction product between the starch and the additional polymer. This condensation reaction product acts as a phase mediator to yield a more homogenous mixture of the more hydrophilic starch and the generally more hydrophobic polymer. Alternatively, or in addition, a phase mediator comprising a block copolymer of starch and one or more polymers such as aliphatic polyesters, aromatic polyesters, aromatic-aliphatic copolyesters, polyesteramides, or polyesterurethanes may be added to the thermoplastic starch/polymer blend.

After forming a thermoplastic melt from thermoplastic starch and the at least one polymer, the blend is preferably cooled with water and formed into granulates. This causes the blend to become substantially solidified. It also allows the blend to reabsorb moisture, typically to a final water content of about 1% to about 6% by weight. Water-conditioned blends are more easily processed.

The starch/polymer blends are typically processed at temperatures in a range from about 120° to about 260° C., more preferably in a range from about 140° to about 160° C.

DETAILED DESCRIPTION OF THE PREFERRED EMBODIMENTS

The multitude of biopolymers or biologically degradable polymer mixtures proposed in the prior art are to a great extent constructed on the basis of starch, although native starch is hardly suitable as a technically usable polymer on its own. Starch is proposed because it is readily degradable biologically, has a favorable price, and is free of petroleum products because it is based on a renewable raw material. Because of the poor suitability of native starch as an "engineering plastic" it is proposed according to the invention to use so-called thermoplastic starch, as is proposed, for example, in PCT/WO90/05161. Thermoplastic starch as described therein is obtained by processing native starch in the melt, by means of a plasticizing or swelling agent, to a homogeneous mass, where the proportion of swelling or plasticizing agent is preferably in a range from about 10% to about 40% by weight of the overall mixture. Suitable swelling or plasticizing agents include, for example, glycerol or sorbitol.

Because of the aforementioned limitations of thermoplastic starch as a polymer material by itself, it is now proposed according to the invention to mix said starch with at least one further polymer, such as with an aromatic polyester, with a polyester copolymer, the polyester copolymer being prepared from customary diols and from aromatic and aliphatic dicarboxylic acids, with a polyesteramide, a polyethylene oxide polymer or a polyglycol, a polyesterurethane and/or mixtures thereof. The polymer classes of the diverse polyesters and copolyesters or polyglycols have proven in particular to be suitable materials for improving the rather modest material properties of thermoplastic starch. The aliphatic polyesters proposed in the prior art, which although having good biological degradability, are not particularly suitable because of their likewise modest material properties with regard to melting point and drawability, themselves contribute to an improvement in the material properties of the thermoplastic starch.

In contrast, aromatic polyesters exhibit excellent material properties but their biological degradability is rather moderate. On the other hand, for example, polyester copolymers based on aromatic and aliphatic dicarboxylic acids, polyesteramides and also polyesterurethanes have both outstanding material properties and a rapid biological degradability, which is why they are particularly suitable for use in polymer mixtures with thermoplastic starch.

The polyester copolymers proposed for use in accordance with the invention in the polymer mixture with thermoplastic starch are preferably constructed on the basis, besides the customarily used polyols, of aromatic and aliphatic dicarboxylic acids, and have the following general structure:

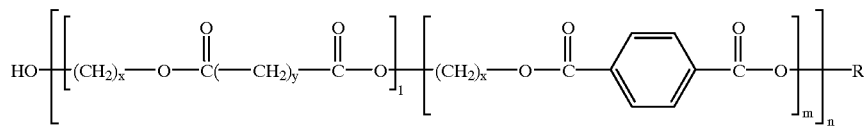

where R=H or $(CH_2)_x$—OH

The polyester copolymers proposed according to the invention can be prepared from petrochemical mass products, such as adipic acid, sebacic acid, terephthalic acid and a diol by means of polycondensation, with commercially customary diols, such as 1,2-ethanediol, 1,3-propanediol, 1,4-butanediol and/or 1,6-hexanediol, being used. What is important is that both aromatic and aliphatic dicarboxylic acids are used, by means of which the statistical polyester copolymers are prepared, for example by means of a conventional polycondensation process.

Statistical copolyesters of aliphatic and aromatic dicarboxylic acids with a proportion, for example, of about 35–55 mol % of aromatic acid, for example terephthalic acid, represent an optimum compromise between biological degradability and material properties, as a result of which they are particularly suitable in mixtures with thermoplastic starch. The biological degradability of statistical copolyesters of this kind lies within 8–12 weeks in compost and earth. In this context reference may be made to U.S. Pat. No. 5,446,079, in which the preparation of aliphatic-aromatic copolyesters is described in detail.

Polyalkylene terephthalates and polyethylene terephthalates which are prepared from aliphatic diols and aromatic dicarboxylic acids have proven, for example, to be suitable co-polyesters for the preparation of a starch/polyester copolymer blend according to the invention.

In addition to the starch/polyester copolymer blends described above and proposed according to the invention, it has become evident that polyesteramides filled or blended with starch or thermoplastic starch and with ester contents of between 30–70% by weight have good mechanical properties, even for the production of films, and have good degradability and compostibility. Proposed are, for example, polyesteramides having a mean molecular weight in a range of 10–300,000, preferably 20–150,000. Otherwise, reference may be made to European patent application EP-A-641 817, in which the synthesis of the polyesteramides proposed in accordance with the invention is described in detail. Mention should merely be made that polyesteramides according to the invention can be constructed from monomers of the following groups:

dialcohols, such as ethylene glycol, 1,4-butanediol, 1,3-propanediol, 1,6-hexanediol diethylene glycol and others; and/or dicarboxylic acid, such as oxalic acid, succinic acid, adipic acid and others, including those in the form of their respective esters (methyl, ethyl, etc.); and/or hydroxycarboxylic acids and lactones, such as caprolactone and others; and/or amino alcohols, such as ethanolamine, propanolamine, etc.; and/or cyclic lactams, such as ϵ-caprolactam or laurolactam, etc.; and/or ω-aminocarboxylic acids, such as aminocaproic acid, etc.; and/or mixtures (1:1 salts) of dicarboxylic acids such as adipic acid, succinic acid etc. and diamines such as hexamethyl enediamine, diaminobutane, etc.

In the case where the polymer mixture is based extensively on thermoplastic starch and an aromatic polyester, an aliphatic-aromatic copolyester, or a polyesteramide, it may be advantageous to add an aliphatic polyester or copolyester, such as polycaprolactone, for example, as a further component. By this means the relatively poor biological degradability, for example, of the aromatic polyester is compensated by the excellent degradability of the aliphatic polyester. As an example of this there may be mentioned a polymer mixture consisting of thermoplastic starch, at least one polyethylene terephthalate (PET) or a polyalkylene terephthalate, and polycaprolactone. Other examples of aliphatic polyesters or copolyesters are polylactic acid, polyhydroxybutyric acid, polyhydroxybutyric acid-hydroxyvaleric acid copolymer, and/or mixtures thereof. Polyhyroxybenzoic acid may also be used.

Depending on how the preparation of the polymer mixture is carried out it is advantageous if this mixture additionally contains a block copolymer as phase mediator in order to form a continuous, homogeneous phase between the thermoplastic starch and the hydrophobic polymer in the form of the polyester. A phase mediator of this kind can, for example, be a reaction mixture obtained by essentially anhydrous mixing of thermoplastic starch or, if desired, native or destructurized starch, with an aliphatic or aromatic polyester or copolyester, with an aromatic/aliphatic copolyester, with a polyesteramide, and/or a polyesterurethane.

The proportion of thermoplastic starch containing the above-mentioned plasticizing or swelling agent can make up a proportion of between 10–95% by weight, based on the overall weight, in the polymer mixture proposed in accordance with the invention; preferably, 30–75% by weight of thermoplastic starch is used. The proportion of thermoplastic starch depends, on the one hand, on the polyester or copolyester used and, on the other hand, on the intended use of the polymer mixture, such as injection molding, extrusion or film blowing. The requirements with regard to the material properties also influence the proportion of thermoplastic starch. If, for example, heightened material requirements with respect to mechanical and thermal properties are imposed, a proportion of thermoplastic starch in the range of 40–65% by weight will preferably be targeted; consequently, the price of the mixture remains acceptable in any case.

Also a subject of the present invention are mixtures containing 30–90% by weight, especially, 40–80% by weight of thermoplastically processible polyesteramides comprising 30–70% by weight aliphatic esters and 30–70% by weight aliphatic amide structures, where, furthermore, preferably 10–90% by weight, in particular, 20–60% by weight of starch or thermoplastic starch are contained.

The addition of further additives, such as plasticizers, stabilizers, antiflaming agents and also further, biologically degradable polymers, such as cellulose esters, cellulose acetate, cellulose, polyhydroxybutyric acid, hydrophobic proteins, polyvinyl alcohol, etc., is possible and again is guided by the requirements with regard to the polymer mixture to be prepared and of course also by the availability of the corresponding components. The polymers indicated below are also suitable as additives, such as gelatins, proteins, zeins, polysaccharides, cellulose derivatives, polylactides, polyvinyl alcohol, polyvinyl acetate, polyacrylates, sugar alcohols, shellac, casein, fatty acid derivatives, plant fibers, lecithin, chitosan, polyesterpolyurethanes and polyesteramides. Mention should also be made of polyester blends consisting of thermoplastic starch, the aliphatic/aromatic polyester proposed according to the invention and, as further component, copolymers selected from ethylene-acrylic acid copolymer and ethylene-vinyl alcohol copolymer.

Also suitable as fillers are, in particular, organic fillers obtained from renewable raw materials, for example cellulose fibers.

In order to reduce the hydrophilic polymer properties of materials comprising thermoplastic starch it is also possible to add crosslinking agents, for example alkylketene dimers of the following general formula:

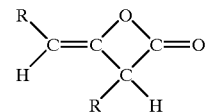

where R=linearly saturated alkyl group in the range from $C_{12}$–$C_{24}$.

The concentration of such network agents amounts as a rule to about 0.05–2%, based on the weight proportion of dry thermoplastic starch in the polymer mixture, preferably 0.1–1% by weight. The proposed alkylketene dimers react in this case with the hydroxyl groups of the starch polymer.

The preparation of the polymer mixture proposed according to the invention takes place by mixing starch, such as preferably thermoplastic starch, together with the aromatic polyester and/or the polyester copolymer containing aromatic and aliphatic constituents in the melt, the water content in the mixture being reduced before or during mixing to less than 1% by weight, based on the weight of the mixture.

Especially in the case of the exclusive use of an aromatic polyester together with the thermoplastic starch for the preparation of the polymer mixture it has proven advantageous to add, in addition, an aliphatic polyester during the preparation. Examples of suitable aliphatic polyesters are for example, polycaprolactone, polylactic acid, etc., as already set out above. Further suitable aliphatic polyesters are, for example, polyethylene succinate (PESU) and polybutylene succinate (PBSU). The latter aliphatic polyesters are formed by reaction of glycols with aliphatic dicarboxylic acids and other acids and have the following general structural formula:

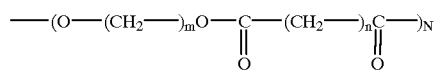

In every case it is proposed, in accordance with a preferred variant embodiment of the process according to the invention, to reduce the water content during the mixing of the melt to below 0.5% by weight, preferably even to below 0.1% by weight, based on the overall weight of the mixture.

In the preparation of the polymer mixture proposed in accordance with the invention, the thermoplastic starch is present to begin with as a so-called disperse phase, while the polyester or the copolyester, the polyesteramide or the polyesterurethane, representing a hydrophobic polymer, is present as a substantially coherent, continuous phase. An obvious supposition, then, is that when the two polymers are mixed with the exclusion of water the ester groups incorporated in the molecule chains of the polyester or copolyester, etc. undergo esterification reactions with the thermoplastic starch, as a result of which the molecule chains reacting in this way form a phase mediator with the starch which allows a molecular coupling of the two phases, and consequently a continuous phase is formed. In the case of moisture this reaction is in competition, since in the presence of water the acid ester groups do not react with the starch, to form the phase mediator, but instead are hydrolyzed. This, however, prevents formation of the phase mediator, which renders flawless dispersing or homogenizing impossible. It is of course possible to use a phase mediator from the outset, such as a block copolymer which comprises at least two blocks, one block being at least substantially soluble in the hydrophobic polyester phase and the other block being at least substantially soluble in the starch phase. In this context reference may be made to DE 42 37 535.5.

Depending on the aromatic, aliphatic, aromatic/aliphatic copolyester polyesteramide and/or polyesterurethane used, mixing is conducted in the melt in a temperature range between 120–260° C., preferably in a range of 140–160° C. The mixing temperature must be chosen so that no damage can occur to the polyester or copolyester used. The mixing of the thermoplastic starch with the polyester component or components, together if desired with further additives and components, takes place preferably in an extruder or kneader, which preferably has a devolatilizing device, for the continuous removal of moisture, in order to attain the required freedom from water. It has been found that, when the thermoplastic starch is mixed with the polyester or polyesters, water is formed, which allows one to draw the conclusion of, for example, the above-mentioned reaction of the ester groups with the starch to form the phase mediator. On leaving the extruder or kneader through the die the melt has an extremely low water content, preferably less than 0.5%, more preferably less than 0.1% by weight.

After removal from the die the melt is preferably cooled in a water bath and conditioned before being subjected subsequently granulated, for example. It has proven advantageous if the melt, which is dry per se, is cooled in a water bath so that it absorbs within the order of magnitude of 2% to about 6% by weight, based on the overall weight, of water, in order to ensure flawless granulation.

The polymer mixture prepared in accordance with the invention, comprising at least thermoplastic starch and, for example, the polyester copolymer comprising aromatic and aliphatic blocks, is outstandingly suitable as a polymer material for a very wide variety of applications in the field of so-called "engineering plastics". Processing in the injection molding process, as well as by extrusion and film blowing, is possible, for instance.

However, when processing the polymer mixture according to the invention it has been found advantageous if the polymer mixture, which is present for example as granules, is conditioned before processing, either by means of water or with a plasticizer, such as glycerol or a mixture thereof. The target is, for example, a water content of about 1–6% by weight, based on the overall weight, preferably 3–5% by weight, as is usual, for example, in the processing of polyesters. Also, the injection moldings extrudates or films produced are preferably stored directly after their preparation in an environment having a relative humidity of at least 40%, preferably at least 45–50%.

Examples of possible and preferred polymer mixtures, exhibiting at least starch or thermoplastic starch and a hydrophobic polymer are listed in Tables 1–4 depicted below. These examples are supplemented by an additional Experiment 29.

The total of 29 examples indicated in this case include both components which have been used for the preparation of thermoplastic starch in the sense of plasticizing agents or swelling agents and the possible polymeric mixing partners to the thermoplastic starch for the preparation of the polymer mixtures proposed in accordance with the invention. The tables include, moreover, the processing conditions and, in particular, the water content in the extruder which prevails during the preparation of the polymer mixture, and which without exception amounted to less than 0.1% by weight. In addition, preferred application options for the polymer mixtures prepared by way of example are set out in the tables. The tables of course contain only examples, and all components mentioned at the outset are suitable for mixing with starch or thermoplastic starch for preparing starting polymer mixtures, defined in accordance with the invention, for both technical and nontechnical applications.

EXAMPLES 1–7

TABLE 1

| Example | 1 | 2 | 3 | 4 | 5 | 6 | 7 |
|---|---|---|---|---|---|---|---|
| [1]Starch % | 42.2 | 24.0 | 29.9 | 24.0 | 33.0 | 38.0 | 21.5 |
| [1]Sorbitol % | 14.0 | 8.0 | 9.5 | 8.0 | 9.9 | 11.8 | 6.9 |
| [1]Glycerol % | 9.5 | 6.0 | 6.5 | 6.0 | 7.9 | 9.3 | 2.1 |
| [2]TPS % | 60.5 | 34.9 | 42.0 | 34.9 | 46.7 | 54.5 | 27.8 |
| $H_2O$ % | <0.1 | <0.1 | <0.1 | <0.1 | <0.1 | <0.1 | <0.1 |
| [3]PLA % | — | — | — | — | 40.0 | 10.9 | — |
| [4]Polyamide 1 | 34.3 | 50.0 | — | — | 9.2 | — | 69.5 |
| [5]Polyester 1 | — | — | 54.1 | 45.0 | — | 30.0 | — |
| [6]PCL % | — | 12.0 | — | 17.0 | — | — | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 212 | 225 | 210 | 210 | 215 | 210 | 200 |
| Pressure bar | 8.5 | 2.0 | 2.5 | 2.5 | 6.2 | 7.5 | 0.5 |
| MFI g/10' | 9 | 13 | 11.5 | 13 | 8.5 | 8.0 | 29 |
| Granules | 4 mm | 4 mm | 4 mm | 4 mm | 4 mm | 4 mm | 4 mm |
| Gra $H_2O$ % | 3.0 | 3.6 | 3.4 | 3.6 | 3.4 | 3.4 | 3.0 |
| Application | | | | | | | |
| Blown film | + | + | + | + | + | + | − |
| Flat film | + | + | + | + | + | + | − |
| Sheets | + | + | + | + | + | + | − |
| Injection | + | − | − | − | − | − | − |

TABLE 1-continued

| Example | 1 | 2 | 3 | 4 | 5 | 6 | 7 |
|---|---|---|---|---|---|---|---|
| molding | <0.4%* | | | | | | |
| Fibers | − | + | − | + | − | − | + |

[1] Starch = native potato starch dried 3.5% $H_2O$, sorbitol = sorbitol LG DHR 71%, glycerol 99.5%;
[2] TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3] PLA (polylactic acid resin) — Mitsui Toatsu Chemicals LACEA H 100 MFR 13 190° C. 2.16 kg;
[4] Polyamide 1 = Bayer BAK 1095 polyersteramide MFI 2.5 150° C. 2.16 kg;
[5] Polyester 1 = BASF ZK 242/108 copolyester of aliphatic diols and aliphatic/aromatic dicarboxylic acids MVR 3.0 at 190° C./2.16 kg;
[6] PCL (polycaprolactone) + Union Carbide Tone Polymer P-787 MFI 1.0 125° C. 44 psi g/10 mm;
[7] Extrusion Equipment = Werner & Pfleiderer ZSK 40;
*0.1–0.4% water content

EXAMPLES 8–14

TABLE 2

| Example | 8 | 9 | 10 | 11 | 12 | 13 | 14 |
|---|---|---|---|---|---|---|---|
| [1]Starch % | 38.2 | 24.6 | 29.2 | 24.6 | 30.7 | 28.0 | 21.5 |
| [1]Sorbitol % | 12.8 | 8.2 | 9.4 | 8.8 | 9.1 | 8.8 | 6.9 |
| [1]Glycerol % | 8.5 | 6.0 | 6.2 | 6.0 | 7.4 | 6.2 | 4.1 |
| [2]TPS % | 54.5 | 35.5 | 41.1 | 36.0 | 43.5 | 39*.5 | 29.7 |
| $H_2O$ % | <0.1 | <0.1 | <0.1 | <0.1 | <0.1 | <0.1 | <0.1 |
| [3]PPDX % | 34.0 | — | — | 6.5 | — | — | 33.8 |
| [4]PT-C300 | — | — | 45.1 | — | — | — | — |
| [5]PT-T8-200 | — | 32.5 | — | — | 47.0 | 57.0 | — |
| [6]BAK | 6.5 | 28.7 | 10.1 | 54.1 | 5.8 | — | 33.7 |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 220 | 214 | 240 | 215 | 215 | 210 | 205 |
| Pressure bar | 6.5 | 3.5 | 5.5 | 7.5 | 4.5 | 7.5 | 0.5 |
| MFI g/10' | 8 | 13 | 2.5 | 11.5 | 8.5 | 8.0 | 30 |
| Granules | 4 mm | 4 mm | 4 mm | 4 mm | 4 mm | 4 mm | 4 mm |
| Gra $H_2O$ % | 3.9 | 3.6 | 3.5 | 3.3 | 3.4 | 3.6 | 3.2 |
| Application | | | | | | | |
| Blown film | + | + | + | + | + | + | − |
| Flat film | + | + | + | + | + | + | − |
| Sheets | + | + | + | + | + | + | − |
| Injection molding | +<br><0.15* | − | +<0.4* | − | − | − | − |
| Fibers | − | − | − | − | − | − | + |

[1] Starch = native potato starch dried 3.5% $H_2O$, sorbitol = sorbitol LG DHR 71%, glycerol 99.5%;
[2] TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3] PPDX. Polyparadioxanone. Shell International Chemicals Ltd. peak melting deg ° C. 110.;
[4] PT-C3OOZT. Enviro Plastic, Planet Polymers, VICAT Softening Temp. 89° C. Polyethylene oxide polymers;
[5] PT-T8-2OODL. Enviro-Plastic C. Planet Polymers, Polyethylene oxide polymers;
[6] Polyesteramide BAK 1095, Bayer AG, MFI 2.5 150° C., 2.16 kg;
[7] Extrusion Equipment = Werner & Pfleiderer ZSK 40;
*0.1–0.4% water content

EXAMPLES 15–21

TABLE 3

| Example | 15 | 16 | 17 | 18 | 19 | 20 | 21 |
|---|---|---|---|---|---|---|---|
| [1]Starch % | 20.9 | 24.6 | 20.4 | 24.6 | 9.2 | 9.2 | 9.2 |
| [1]Sorbitol % | 7.0 | 8.2 | 6.6 | 8.8 | 2.7 | 2.7 | 2.7 |
| [1]Glycerol % | 4.7 | 6.0 | 4.4 | 6.0 | 2.2 | 2.2 | 2.2 |
| [2]TPS % | 29.9 | 35.5 | 28.6 | 36.0 | 13.0 | 13.0 | 13.0 |
| $H_2O$ % | <0.1 | <0.1 | <0.1 | <0.1 | <0.1 | <0.1 | <0.1 |
| [3]Filler % | 26.9 | — | 25.0 | — | 60.0 | — | 60.0 |
| [4]Polyamide 1 | 40.5 | 36.2 | — | — | 25.9 | 27.9 | — |

TABLE 3-continued

| Example | 15 | 16 | 17 | 18 | 19 | 20 | 21 |
|---|---|---|---|---|---|---|---|
| [5]Polyester 1 | — | — | 43.6 | 35.6 | — | — | 25.9 |
| [6]Filler % | — | 25.0 | — | 25.0 | — | 58.0 | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 203 | 206 | 220 | 215 | 205 | 205 | 220 |
| Pressure bar | 156.5 | 21 | 15 | 22 | 35 | 40 | 35 |
| MFI g/10' | 13 | 9 | 12.5 | 8.5 | 3 | 2.8 | 2.2 |
| Granules | 4 mm | 4 mm | 4 mm | 4 mm | 4 mm | 4 mm | 4 mm |
| Gra $H_2O$ % | 3.5 | 3.6 | 3.4 | 3.6 | 3.4 | 3.4 | 3.0 |
| Application | | | | | | | |
| Blown film | – | – | – | – | – | – | – |
| Flat film | (+) | (+) | (+) | (+) | – | – | – |
| Sheets | + | + | + | + | + | + | + |
| Injection | + | + | + | + | + | + | + |
| molding | <0.2%* | <0.2%* | <0.2%* | <0.2%* | <0.2%* | <0.2%* | <0.2%* |
| Fibers | – | – | – | – | – | – | – |

[1]Starch = native potato starch dried 3.5% $H_2O$, sorbitol = sorbitol LG DHR 71%, glycerol 99.5%;
[2]TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3]Filler, micronized cellulose;
[4]Polyamide 1 = Bayer BAK 1095 polyesteramide MFI 2.5 150° C. 2.16 kg;
[5]Polyester 1 = BASF ZK 242/108 copolyester of aliphatic diols and aliphatic/aromatic dicarboxylic acids MVR 3.0 at 190° C./2.16 kg;
[6]Filler, micronized cotton
[7]Extrusion Equipment = Werner & Pfleiderer ZSK 40;
*0.1–0.4% water content

EXAMPLES 22–28

TABLE 4

| Example | 22 | 23 | 24 | 25 | 26 | 27** | 28** |
|---|---|---|---|---|---|---|---|
| [1]Starch % | 34.5 | 35.5 | 40.5 | 50.5 | 60.7 | 70.3 | 67.8 |
| [1]Sorbitol % | — | — | — | — | — | — | — |
| [1]Glycerol % | 16.3 | 16.5 | 12.0 | 7.1 | 4.0 | 4.5 | — |
| [2]Polyamide 1 | 25.0 | 23.5 | 47.5 | 42.4 | 35.3 | 25.2 | 32.2 |
| [2]TPS % | 74.8 | 74.4 | 98.6 | 98.5 | 98.2 | 87.4 | 87.8 |
| $H_2O$ % | <0.1 | <0.1 | <0.1 | <0.1 | <0.1 | <0.1 | <0.1 |
| [3]PLA % | 24.2 | — | — | — | 40.0 | 10.9 | — |
| [5]Polyester 1 | — | 24.5 | — | — | — | — | — |
| [6]Polyester 2 | — | — | — | — | — | — | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 200 | 206 | 190 | 170 | 160 | 155 | 155 |
| Pressure bar | 15 | 15 | 20 | 26 | 31 | 35 | 37 |
| MFI g/10' | 12 | 14 | 122.5 | 10 | 6 | 5 | 5.5 |
| Granules | 4 mm | 4 mm | 4 mm | 4 mm | 4 mm | 4 mm | 4 mm |
| Gra $H_2O$ % | 2.1 | 2.1 | 2.2 | 2.6 | 0.4 | 0.4 | 0.3 |
| Application | | | | | | | |
| Blown film | + | + | + | + | + | + | + |
| Flat film | + | + | + | + | + | + | + |
| Sheets | + | + | + | + | + | + | + |
| Injection | – | – | – | + | + | + | + |
| molding | | | | | <0.15%* | <0.2%* | <0.2%* |
| Fibers | – | – | – | – | – | – | – |

[1]Starch = native potato starch dried 3.5% $H_2O$, sorbitol = sorbitol LG DHR 71%, glycerol 99.5%;
[4]Polyamide 1 = Bayer BAK 1095 polyesteramide MFI 2.5 150° C. 2.16 kg, function of plasticizer;
[2]TPS = thermoplastic starch = starch + sorbitol + glycerol and/or BAK 1095, <0.1% $H_2O$. — Water content by devolatilization, according to the known process EP 0 397 819. 27 + 28 starch = native potato starch 18% $H_2O$:
[3]PLA (Polylactic acid resin) = Mitsui Toatsu Chemicals LACEA H 100 MFR 13 190° C. 2.16 kg;
[5]Polyester 1 = BASF ZK 242/108 copolyester of aliphatic diols and aliphatic/aromatic dicarboxylic acids MVR 3.0 at 190° C./2.16 kg;
[6]PCL (Polycaprolactone) = Union Carbide Tone Polymer P-787 MFI 1.0 125° C. 44 psi g/10 mm;
[7]Extrusion Equipment = Werner & Pfleiderer ZSK 40;
*0.1–0.4% water content

Experiment Example 29

In analogy to experiment 28, the polyesteramide BAK 1095 was, in example 29, compounded with 10% potato starch in the twin-screw extruder ZSK 40 at 155° C. and 20 bar with removal of water, extruded with 0.15% residual moisture, and, after the polyester extrudate had cooled, was granulated. The polymer mixture has an MFI g/10' of 25 at 150° C./5 kg and is suitable for producing blown and flat films.

Injection moldings, extrudates and films produced by means of polymer mixtures proposed in accordance with the invention have not only relatively good material properties but also an outstanding biological degradability, which is why they are able to make a significant contribution to the acute problem of waste. For example, films produced from a polymer mixture proposed in accordance with the invention are outstandingly suitable for a very wide variety of applications in the agricultural sector, for example for the covering of fields, since such films after their use can either be composted or else ploughed into the earth in the field. Polymer mixtures of this kind are also suitable for the production of composting sacks, containers for composting waste, etc. In addition, containers and bottles, for example, can be produced from the polymer mixture proposed in accordance with the invention by means of blow molding.

The polymer mixtures according to the invention are also suitable, however, for the production of textile articles, for example for the production of fibers, monofilaments, sheetlike structures, such as wovens, felts, nonwovens, so-called backsheets, textile composites, flocks, wadding, and linear structures, for example filaments, yarns, cables cords, etc. In particular it has been found in practice that the polymer mixtures according to the invention are suitable for the production of sanitary articles, such as diapers, sanitary towels, incontinence products and bed liners. The structure of these hygiene articles includes, inter alia, nonwovens produced from the polymer material according to the invention, since this material has a very good skin compatibility, is respiratorily active, is permeable to water vapor at the same time as being watertight, and yet is fully biologically degradable.

A large proportion of the polymer mixtures proposed in accordance with the invention, especially those containing thermoplastic starch and/or a copolyester and/or a polyesteramide and/or a polyesterurethane, are suitable, moreover, as adhesives or else can be used as coatings, for example for the impregnation of textile wovens. In this case it has been found that the polymer mixtures proposed in accordance with the invention which are suitable for these areas of application are introduced and applied preferably in a form in which they are at least partially dissolved in alcoholic solvents. For example, in connection with Experiment Example 29 it was found, surprisingly, that the polymer mixture thus prepared is soluble in hot alcohol/ethanol mixture. A 20% strength alcoholic solution directly after preparation has a viscosity of loom Pas. In this case too there was a possible use in the context of a biologically degradable adhesive, as a coating or as an impregnation which brings about hydrophobic properties and is permeable to water vapor. The use ascertained with regard to Experiment Example 29 can also be transferred to a large number of the other experiment examples and to further polymer mixtures proposed in accordance with the invention.

The polymer mixtures according to the invention are, however, of course suitable for wide variety of other applications, for example for disposable injection-molded products and the like.

What is claimed and desired to be secured by United States Letters Patent is:

1. A method of manufacturing an at least partially biodegradable thermoplastic starch/polymer blend comprising:
    (a) combining starch and at least one plasticizing agent under conditions that result in the formation of a thermoplastic starch melt having a water content of less than 5% by weight while in a melted state; and
    (b) combining at least one polymer selected from the group consisting of aromatic polyesters, polyester copolymers having both aliphatic and aromatic blocks, polyester amides, polyethylene oxide polymers, polyglycols, and polyester urethanes with the thermoplastic starch melt under conditions that result in the formation of the thermoplastic starch/polymer blend,
    wherein the thermoplastic starch/polymer blend includes a thermoplastic starch portion, comprising the starch and plasticizing agent, in an amount in a range from about 10% to about 95% by weight of the thermoplastic starch/polymer blend.

2. A method of manufacturing as defined in claim 1, wherein the thermoplastic starch/polymer blend is processed in a manner so as to have a water content of less than about 1% by weight while in a melted state and prior to cooling with water.

3. A method of manufacturing as defined in claim 2, wherein the water content is reduced to below about 1% by weight before or during combining of the at least one polymer with the thermoplastic starch melt.

4. A method of manufacturing as defined in claim 2, wherein the water content is reduced to below about 0.5% by weight before or during combining of the at least one polymer with the thermoplastic starch melt.

5. A method of manufacturing as defined in claim 2, wherein the water content is reduced to below about 0.1% by weight before or during combining of the at least one polymer with the thermoplastic starch melt.

6. A method of manufacturing as defined in claim 1, wherein the at least one polymer and the thermoplastic starch melt are combined under conditions that yield a phase mediator comprising at least one condensation reaction product of the starch and the at least one polymer.

7. A method of manufacturing as defined in claim 1, wherein the thermoplastic starch/polymer blend is cooled with water in order to solidify the blend and allow it to reabsorb water so that the thermoplastic starch/polymer blend has a final water content in a range from about 1% to about 6% by weight when solidified.

8. A method of manufacturing as defined in claim 1, wherein the thermoplastic starch melt is formed from starch that has been initially predried to below its natural water content prior to mixing with the plasticizing agent.

9. A method of manufacturing as defined in claim 1, wherein the thermoplastic starch melt is formed from starch that initially includes its natural water content, wherein the natural water content of the starch is reduced after mixing the starch with the plasticizing agent.

10. A method of manufacturing as defined in claim 1, wherein steps (a) and (b) are carried out in a single continuous process.

11. A method of manufacturing as defined in claim 1, wherein steps (a) and (b) are carried out in separate and successive processes.

12. A method of manufacturing as defined in claim 1, wherein steps (a) and (b) are carried out, at least in part, at one or more temperatures in a range from about 120° to about 260° C.

13. A method of manufacturing as defined in claim 1, wherein steps (a) and (b) are carried out, at least in part, at one or more temperatures in a range from about 140° to about 160° C.

14. A method of manufacturing as defined in claim 1, wherein the thermoplastic starch/polymer blend includes a thermoplastic starch portion comprising the starch and plasticizing agent and included in an amount in a range from about 30% to about 75% by weight of the thermoplastic starch/polymer blend.

15. A method of manufacturing as defined in claim 1, wherein the plasticizing agent is selected from the group consisting of glycerol, sorbitol, sugar alcohols, hydroxy acids, salts of hydroxy acids, hydroxy acid oligomers, salts of hydroxy acid oligomers, polyesteramides, polyvinyl alcohol, and mixtures thereof.

16. A method of manufacturing as defined in claim 1, wherein the thermoplastic starch/polymer blend further includes at least one additional component selected from the group consisting of additional plasticizers, stabilizers, antiflaming agents, additional biological degradable biopolymers, plant fibers, organic fillers, cellulose esters, polyvinyl alcohol, polyvinyl acetate, polyacrylates, hydrophobic proteins, gelatin, zein, polysaccharides, polylactides, lecithin, chitosan, shellac, and cross-linking agents.

17. A method of manufacturing as defined in claim 1, wherein the thermoplastic starch/polymer blend further includes at least one aliphatic polyester selected from the group consisting of polylactic acid, polyhydroxybutyric acid, polyhydroxybutyric acid-hydroxyvaleric acid copolymer, and polycaprolactone.

18. A method of manufacturing as defined in claim 1, wherein the thermoplastic starch/polymer blend further includes at least one block copolymer comprising starch and a polymer selected from the group consisting of aliphatic polyesters, aromatic polyesters, aromatic-aliphatic copolyesters, polyesteramides, and polyesterurethanes.

19. A method of manufacturing as defined in claim 1, wherein the thermoplastic starch/polymer blend comprises thermoplastic starch, polyalkylene terephthalate, and polycaprolactone.

20. A method of manufacturing as defined in claim 1, wherein the thermoplastic starch/polymer blend is further processed into a final product selected from the group consisting of granulates, single-layer or multilayer films, containers, blow molded articles, textile products, sanitary articles, coatings, and adhesives.

21. A method of manufacturing an at least partially biodegradable thermoplastic starch/polymer blend comprising:
(a) mixing starch and at least one plasticizing agent under conditions that result in the formation of a thermoplastic starch melt;
(b) mixing at least one polymer selected from the group consisting of aromatic polyesters, polyester copolymers having both aliphatic and aromatic blocks, polyester amides, polyethylene oxide polymers, polyglycols, and polyester urethanes with the thermoplastic starch melt under conditions that result in the formation of a thermoplastic starch/polymer melt having a water content of less than about 1% by weight and
(c) cooling the thermoplastic starch/polymer melt with water in order to solidify the blend and allow it to reabsorb water so that the thermoplastic starch/polymer blend has a final water content in a range from about 1% to about 6% by weight when solidified.

22. A method of manufacturing as defined in claim 21, wherein steps (a) and (b) are carried out in separate successive processes.

23. A method of manufacturing at least partially biodegradable thermoplastic starch/polymer blends comprising:
(a) mixing starch and at least one plasticizing agent under conditions that result in the formation of a thermoplastic starch melt;
(b) mixing at least one polymer selected from the group consisting of aromatic polyesters, polyester copolymers having both aliphatic and aromatic blocks, polyester amides, polyethylene oxide polymers, polyglycols, and polyester urethanes with the thermoplastic starch melt under conditions that result in the formation of the thermoplastic starch/polymer blend and of a phase mediator dispersed therein comprising at least one condensation reaction product of starch and the at least one polymer.

24. A method of manufacturing as defined in claim 1, wherein the thermoplastic starch/polymer blend comprises thermoplastic starch and at least one polyester formed from at least one diol and at least one aromatic dicarboxylic acid and at least one aliphatic dicarboxylic acid.

25. A method of manufacturing as defined in claim 21, wherein the thermoplastic starch/polymer blend comprises thermoplastic starch and at least one polyester formed from at least one diol and at least one aromatic dicarboxylic acid and at least one aliphatic dicarboxylic acid.

26. A method of manufacturing as defined in claim 21, wherein the thermoplastic starch melt is processed in a manner so as to have a water content less than 5% by weight while in a melted state.

27. A method of manufacturing as defined in claim 21, wherein the thermoplastic starch/polymer blend is further processed into a final product selected from the group consisting of granulates, single-layer or multilayer films, containers, blow molded articles, textile products, sanitary articles, coatings and adhesives.

28. A method of manufacturing as defined in claim 23, wherein the thermoplastic starch melt is processed in a manner so as to have a water content less than 5% by weight while in a melted state.

29. A method of manufacturing as defined in claim 23, wherein the thermoplastic starch melt and the at least one polymer are processed under conditions that result in the formation of a thermoplastic starch/polymer melt having a water content of less than about 1% by weight while in a melted state.

30. A method of manufacturing as defined in claim 23, further including cooling the thermoplastic starch/polymer blend with water in order to solidify the blend and allow it to reabsorb water so that the thermoplastic starch/polymer blend has a final water content in a range from about 1% to about 6% by weight when solidified.

31. A method of manufacturing as defined in claim 23, wherein the thermoplastic starch/polymer blend comprises thermoplastic starch and at least one polyester formed from at least one diol and at least one aromatic dicarboxylic acid and at least one aliphatic dicarboxylic acid.

32. A method of manufacturing as defined in claim 23, wherein the thermoplastic starch/polymer blend is further processed into a final product selected from the group consisting of granulates, single-layer or multilayer films, containers, blow molded articles, textile products, sanitary articles, coatings and adhesives.

33. A method of manufacturing an at least partially biodegradable thermoplastic starch/polymer blend comprising:
(a) mixing starch and at least one plasticizing agent under conditions that result in the formation of a thermoplastic starch melt;

(b) mixing at least one polymer selected from the group consisting of aromatic polyesters, polyester copolymers having both aliphatic and aromatic blocks, polyester amides, polyethylene oxide polymers, polyglycols, and polyester urethanes with the thermoplastic starch melt under conditions that result in the formation of a thermoplastic starch/polymer melt; and (c) cooling the thermoplastic starch/polymer melt with water in order to solidify the blend and allow it to reabsorb water so that the thermoplastic starch/polymer blend has a final water content in a range from about 1% to about 6% by weight when solidified, wherein the thermoplastic starch/polymer blend includes a thermoplastic starch portion, comprising the starch and plasticizing agent, in an amount in a range from about 10% to about 95% by weight of the thermoplastic starch/polymer blend, and wherein steps (a) and (b) are carried out, at least in part, at one or more temperatures in a range from about 120° to about 260° C.

* * * * *

UNITED STATES PATENT AND TRADEMARK OFFICE
CERTIFICATE OF CORRECTION

PATENT NO. : 6,235,816 B1
DATED : May 22, 2001
INVENTOR(S) : Jurgen Lorcks, Winfried Pommeranz and Harald Schmidt It is certified that error appears in the above-identified patent and that said Letters Patent is hereby corrected as shown below:

Column 2,
Line 12, after "which" delete "both"
Lines 55-56, after "agents" delete "is further added to the themoplastic starch/polymer blend"

Column 5,
Lines 16-17, after "component" insert -- . --

Column 6,
Line 8, before "further" insert -- a --

Column 7,
Line 37, after "being" delete "subjected"

Column 8,
Line 16, after "moldings" insert -- , --

Column 13,
Line 28-29, change "shee-tlike" to -- sheet-like --
Line 32, after "particular" insert -- , --
Line 47, after "case" insert -- , --
Line 56, change "loom Pas" to -- 100 mPa*s --
Line 66, after "example" insert -- , --

Column 15,
Line 59, after "weight" insert --; --

Signed and Sealed this

Sixteenth Day of April, 2002

Attest:

JAMES E. ROGAN
*Attesting Officer*      *Director of the United States Patent and Trademark Office*